(12) United States Patent
Jang

(10) Patent No.: US 11,841,795 B2
(45) Date of Patent: Dec. 12, 2023

(54) STORAGE DEVICE FOR SETTING A FLAG IN A MAPPING TABLE ACCORDING TO A SEQUENCE NUMBER AND OPERATING METHOD THEREOF

(71) Applicant: SK hynix Inc., Gyeonggi-do (KR)

(72) Inventor: Min Jun Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/587,088

(22) Filed: Jan. 28, 2022

(65) Prior Publication Data

US 2022/0292029 A1    Sep. 15, 2022

(30) Foreign Application Priority Data

Mar. 10, 2021 (KR) .................. 10-2021-0031622

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC .................. G06F 12/0246; G06F 2212/7201
See application file for complete search history.

(56) References Cited

U.S. PATENT DOCUMENTS

| | | | | |
|---|---|---|---|---|
| 9,513,829 B1* | 12/2016 | Wang | ................. | G06F 16/2343 |
| 10,416,903 B2* | 9/2019 | Fackenthal | ............ | G06F 3/064 |
| 10,489,291 B2* | 11/2019 | Hsu | ....................... | G06F 3/0652 |
| 2011/0113184 A1* | 5/2011 | Chu | ................... | G06F 11/1441 |
| | | | | 711/E12.008 |
| 2018/0357165 A1* | 12/2018 | Helmick | ............ | G06F 12/0246 |
| 2019/0004700 A1* | 1/2019 | Oshinsky | ............ | G06F 12/0246 |
| 2019/0005079 A1* | 1/2019 | Li | ....................... | G06F 16/2272 |
| 2019/0354483 A1* | 11/2019 | Jin | ....................... | G06F 3/0679 |
| 2021/0141532 A1* | 5/2021 | Byun | .................... | G06F 3/0611 |

FOREIGN PATENT DOCUMENTS

KR    10-2012-0012375 A    2/2012
KR    10-2020-0023757 A    3/2020

* cited by examiner

*Primary Examiner* — Chie Yew
(74) *Attorney, Agent, or Firm* — IP & T GROUP LLP

(57) ABSTRACT

A storage device includes: a memory device including a plurality of memory blocks; a buffer memory device including first and second buffers which temporarily store write data; and a memory controller for controlling the memory device and the buffer memory device to perform a write operation of storing the write data in the memory device. The memory controller allocates a command to a mapping table including mapping information corresponding to a physical address according to a reception order of the command, when the memory controller receives the command from a host, and controls the buffer memory device such that write data is temporarily stored in a corresponding one of the first and second buffers. When write data temporarily stored in the first or second buffer is flushed to the memory device, the memory controller updates the mapping table, using mapping information corresponding to the flushed write data.

9 Claims, 14 Drawing Sheets

Mapping Table

STORAGE DEVICE FOR SETTING A FLAG IN A MAPPING TABLE ACCORDING TO A SEQUENCE NUMBER AND OPERATING METHOD THEREOF

CROSS-REFERENCE TO RELATED APPLICATION

The present application claims priority under 35 U.S.C. § 119(a) to Korean patent application number 10-2021-0031622 filed on Mar. 10, 2021, the entire disclosure of which is incorporated by reference herein.

BACKGROUND

1. Technical Field

The present disclosure generally relates to an electronic device, and more particularly, to a storage device and an operating method thereof.

2. Related Art

A storage device is a device which stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments of the present disclosure provide a storage device for sorting data having different attributes in a plurality of buffer memories and effectively managing a P2L table.

In accordance with an aspect of the present disclosure, there is provided a storage device including: a memory device including a plurality of memory blocks; a buffer memory device including a first buffer and a second buffer, which temporarily store write data; and a memory controller configured to control the memory device and the buffer memory device to perform a write operation of storing the write data in the memory device, wherein the memory controller is further configured to: allocate a command to a mapping table including mapping information corresponding to a physical address according to a reception order of the command, when the memory controller receives the command from a host; control the buffer memory device such that write data corresponding to one of the first buffer and the second buffer is temporarily stored in a corresponding one of the first buffer and the second buffer; and update, when write data temporarily stored in the first buffer or the second buffer is flushed to the memory device, the mapping table by using mapping information corresponding to the flushed write data.

In accordance with another aspect of the present disclosure, there is provided a storage device including: a buffer memory device including a mapping table including mapping information of a physical address and a logical address of a memory device; and a memory controller configured to: allocate a command to a mapping table including mapping information corresponding to the physical address of the memory device according to a reception order of the command, when the memory controller receives the command from a host; control the buffer memory device such that write data corresponding to one of a first buffer and a second buffer, which are included in the buffer memory device, is temporarily stored in a corresponding one of the first buffer and the second buffer; and update, when write data temporarily stored in the first buffer or the second buffer is flushed to the memory device, the mapping table by using mapping information corresponding to the flushed write data.

BRIEF DESCRIPTION OF THE DRAWINGS

Various embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

The present disclosure may apply various changes and different shapes, therefore the present disclosure is illustrated in details with particular examples. However, the examples are not limited to certain shapes but apply to all changes and equivalent materials. The drawings included are illustrated in a fashion where the figures are expanded for the better understanding. In describing the embodiments, a description of technologies that are known in the art and are not directly related to the present disclosure is omitted. This is to further clarify the gist of the present disclosure without clutter.

Hereinafter, various embodiments of the present disclosure will be described in detail with reference to the accompanying drawings in order for those skilled in the art to be able to readily implement the technical spirit of the present disclosure.

Figure 1:
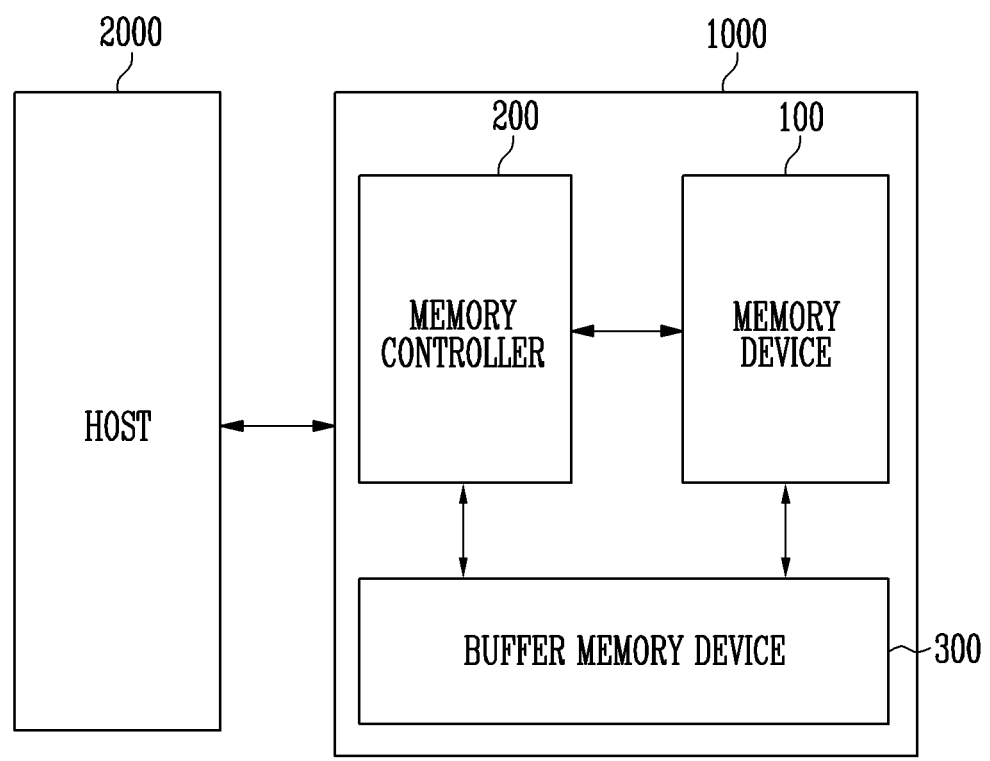
FIG. 1 is a block diagram illustrating a storage device in accordance with an embodiment of the present disclosure.

FIG. 1 is a block diagram illustrating a storage device 1000 in accordance with an embodiment of the present disclosure.

Referring to FIG. 1, the storage device 1000 may include a memory device 100, a memory controller 200, and a buffer memory device 300.

The storage device 1000 may be a device for storing data under the control of a host 2000, such as a mobile phone, a smart phone, an MP3 player, a laptop computer, a desktop computer, a game console, a display device, a tablet PC or an in-vehicle infotainment.

The storage device 1000 may be manufactured as any of various types of storage devices according to a host interface that is a communication scheme with the host 2000. For example, the storage device 1000 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be implemented as any of various types of package types. For example, the storage device 1000 may be implemented as any of various types of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data or use stored data. The memory device 100 operates under the control of the memory controller 200. Also, the memory device 100 may include a plurality of memory dies, and each of the plurality of memory dies may include a memory cell array including a plurality of memory cells for storing data.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The memory cell array may include a plurality of memory blocks. Each memory block may include a plurality of memory cells, and one memory block may include a plurality of pages. The page may be a unit for storing data in the memory device 100 or reading data stored in the memory device 100.

The memory device 100 may be implemented as a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is described.

The memory device 100 may receive a command and an address from the memory controller 200. The memory device 100 may access an area selected by the received address in the memory cell array. The memory device 100 accessing the selected area may mean that the memory device 100 performs an operation corresponding to the received command on the selected area. For example, the memory device 100 may perform a write operation (program operation), a read operation, and an erase operation. The program operation may be an operation in which the memory device 100 records data in the area selected by the address. The read operation may mean an operation in which the memory device 100 reads data from the area selected by the address. The erase operation may mean an operation in which the memory device 100 erases data stored in the area selected by the address.

In accordance with an embodiment of the present disclosure, the memory device 100 may perform a migration operation of moving stored data under the control of the memory controller 200. Specifically, the memory device 100 may select a victim block in the memory device 100 under the control of the memory controller 200, and perform an operation of moving data corresponding to the selected victim block to an open block. That is, the memory device 100 may perform the migration operation as a background operation under the control of the memory controller 200, regardless of any request of host 2000. Accordingly, the performance of stored data can be ensured, and a space to be stored can be secured.

The memory controller 200 may control overall operations of the storage device 1000.

When power is applied to the storage device 1000, the memory controller 200 may execute firmware (FW). The FW may include a Host Interface Layer (HIL) which receives a request input from the host 2000 or outputs a response to the host 2000, a Flash Translation Layer (FTL) which manages an operation between an interface of the host 2000 and an interface of the memory device 100, and a Flash Interface Layer (FIL) which provides a command to the memory device 100 or receives a response from the memory device 100.

The memory controller 200 may receive data and a Logical Address (LA) from the host 2000, and translate the LA into a Physical Address (PA) representing an address of memory cells in which data included in the memory device 100 is to be stored. The LA may be a Logical Block Address (LBA), and the PA may be a Physical Block Address (PBA).

The memory controller 200 may control the memory device 100 to perform a program operation, a read operation, an erase operation, or the like in response to a request from the host 2000. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

The memory controller 200 may control the memory device 100 to autonomously perform a program operation, a read operation, or an erase operation regardless of any requests from the host 2000. For example, the memory controller 200 may control the memory device 100 to perform a program operation, a read operation, or an erase operation, which is used to perform a background operation such as wear leveling, garbage collection, or read reclaim.

In accordance with an embodiment of the present disclosure, the memory controller 200 may control the memory device 100 to autonomously perform a migration operation regardless of any request from the host 2000. The migration operation may be configured with a read operation and a program operation. Specifically, the memory controller 200 may control the memory device 100 to read data stored in a specific memory block regardless of any request from the host 2000, and control the memory device 100 to move the read data to an open block.

The host 2000 may communicate with the storage device 1000, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
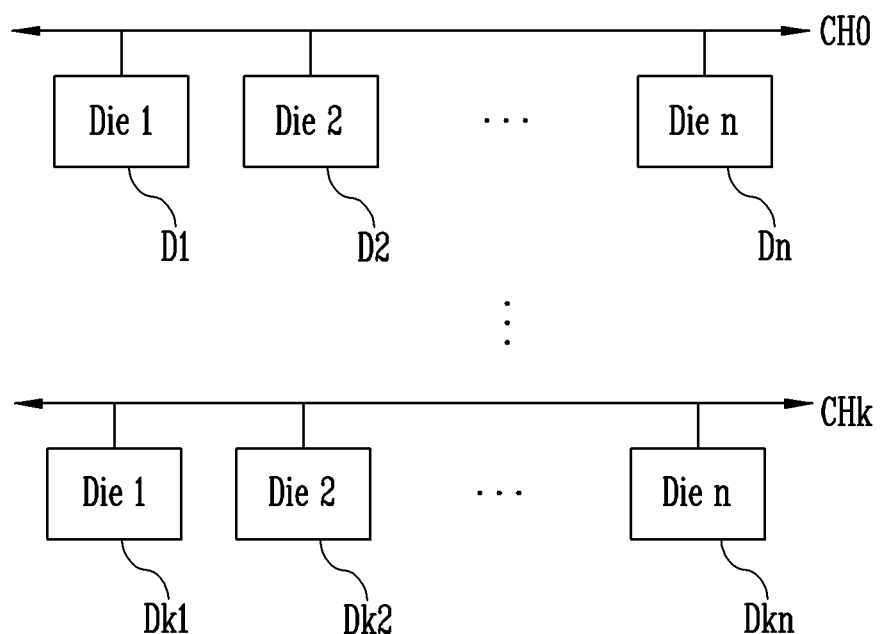
FIG. 2 is a block diagram illustrating a memory device in accordance with an embodiment of the present disclosure.

FIG. 2 is a block diagram illustrating a memory device 100 in accordance with an embodiment of the present disclosure.

Referring to FIG. 2, the memory device 100 may include a plurality of channels CH0 to CHk and a plurality of dies D1 to Dkn connected to the plurality of channels CH0 to CHk. In addition, the memory controller 2000 may be connected to the memory device 100 by using the plurality of channels CH0 to CHk. Specifically, the memory controller 200 may be connected to the plurality of channels CH0 to CHk, and be connected to a plurality of dies D1 to Dn connected to a zeroth channel CH0. That is, the memory controller 200 may communicate with the plurality of dies D1 to Dn by using the zeroth channel CH0.

The memory controller 200 may control the plurality of dies D1 to Dn to operate independently from each other. For example, a first die D1 connected to the zeroth channel CH0 and a first die Dk1 connected to a kth channel CHk do not have common circuits or structures for performing an internal operation. Therefore, the memory controller 200 may control the memory device 100 such that the first die D1 connected to the zeroth channel CH0 and the first die Dk1 connected to the kth channel CHk operate independently from each other. Also, the memory controller 200 may also control the memory device 100 such that the plurality of dies D1 to Dkn connected to different channels (e.g., the zeroth channel CH0 and the kth channel CHk) operate at the same time.

Figure 3:
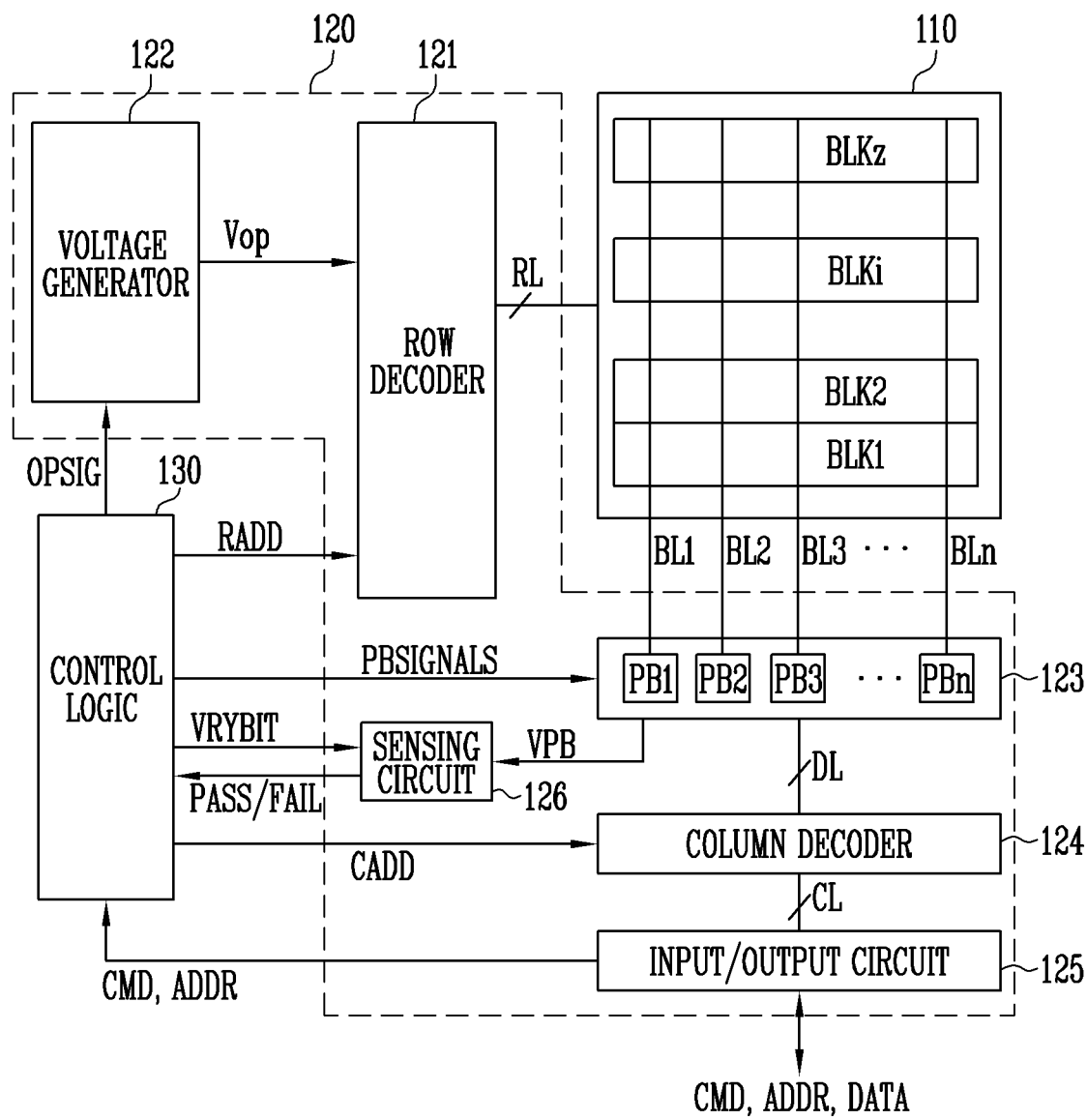
FIG. 3 is a diagram illustrating a die in accordance with an embodiment of the present disclosure.

FIG. 3 is a diagram illustrating a die in accordance with an embodiment of the present disclosure. The plurality of dies D1 to Dkn shown in FIG. 2 may be configured identical to one another, and therefore, the first die D1 connected to the zeroth channel among the plurality of dies D1 to Dkn will be described as an example.

Referring to FIG. 3, the first die D1 may include a memory cell array 110, a peripheral circuit 120, and a control logic 130.

The memory cell array 110 includes a plurality of memory blocks BLK1 to BLKz. The plurality of memory blocks BLK1 to BLKz are connected to a row decoder 121 through row lines RL. The row lines RL may include at least one source select line, a plurality of word lines, and at least one drain select line. The plurality of memory blocks BLK1 to BLKz are connected to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells connected to the same word line may be defined as one page. Therefore, one memory block may include a plurality of pages.

Each of the memory cells included in the memory cell array 110 may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The peripheral circuit 120 may be configured to perform a program operation, a read operation or an erase operation on a selected area of the memory cell array 110 under the control of the control logic 130. That is, the peripheral circuit 120 may drive the memory cell array 110 under the control of the control logic 130. For example, the peripheral circuit 120 may apply various operating voltages to the row lines RL and the bit lines BL1 to BLn or discharge the applied voltages under the control of the control logic 130.

Specifically, the peripheral circuit 120 may include the row decoder 121, a voltage generator 122, the page buffer group 123, a column decoder 124, an input/output circuit 125, and a sensing circuit 126.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may operate under the control of the control logic 130. The row decoder 121 may receive a row address RADD from the control logic 130. Specifically, the row decoder 121 may decode the row address RADD. The row decoder 121 may select at least one memory block among the memory blocks BLK1 to BLKz according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line, and apply a program pass voltage having a level lower than that of the program voltage to unselected word lines. In a program verify operation, the row decoder 121 may apply a verify voltage to the selected word line, and apply a verify pass voltage higher than the verify voltage to the unselected word lines. In a read operation, the row decoder 121 may apply a read voltage to the selected word line, and apply a read pass voltage higher than the read voltage to the unselected word lines.

In an embodiment, an erase operation of the memory device 100 may be performed in a memory block unit. In the erase operation, the row decoder 121 may select one memory block according to the decoded address. In the erase operation, the row decoder 121 may apply a ground voltage to word lines connected to the selected memory block.

The voltage generator 122 may operate under the control of the control logic 130. Specifically, the voltage generator 122 may generate a plurality of voltages by using an external power voltage supplied to the memory device 100 under the control of the control logic 130. For example, the voltage generator 122 may generate a program voltage, a verify voltage, a pass voltage, a read voltage, an erase voltage, and the like under the control of the control logic 130. That is, the voltage generator 122 may generate various operating voltages Vop used in program, read, and erase operations in response to an operation signal OPSIG.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate a plurality of voltages by using the external power voltage or the internal power voltage. For example, the voltage generator 122 may include a plurality of pumping capacitors for receiving the internal power voltage, and generate the plurality of voltages by selectively activating the plurality of pumping capacitors under the control of the control logic 130. In addition, the plurality of generated voltages may be supplied to the memory cell array 110 by the row decoder 121.

The page buffer group 123 may include first to nth page buffers PB1 to PBn. The first to nth page buffers PB1 to PBn may be connected to the memory cell array 110 respectively through first to nth bit lines BL1 to BLn. Also, the first to nth bit lines BL1 to BLn may operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense a voltage or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page may be programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a program verify operation, the first to nth page buffers PB1 to PBn may read page data from the selected memory cells through the first to nth bit lines BL1 to BLn.

In a read operation, the first to nth page buffers PB1 to PBn may read data DATA from the memory cells of the selected page through the first to nth bit lines BL1 to BLn, and output the read data DATA to the input/output circuit 125 under the control of the column decoder 124.

In an erase operation, the first to nth page buffers PB1 to PBn may float the first to nth bit lines BL1 to BLn.

The column decoder 124 may communicate data between the input/output circuit 125 and the page buffer group 123 in response to a column address CADD. For example, the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller 200, to the control logic 130, or exchange data DATA with the column decoder 124.

In a read operation or verify operation, the sensing circuit 126 may generate a reference current in response to an allow bit VRYBIT signal, and output a pass signal PASS or a fail signal FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit VRYBIT in response to the command CMD and the address ADDR.

Also, the control logic 130 may determine whether the verify operation has passed or failed in response to the pass or fail signal PASS or FAIL. The control logic 130 may control the page buffer group 123 to temporarily store verify information including the pass or fail signal PASS or FAIL in the page buffer group 123. Specifically, the control logic 130 may determine a program state of a memory cell in response to the pass or fail signal PASS or FAIL. For example, when the memory cell operates as a Triple Level Cell (TLC), the control logic 130 may determine whether the program state of the memory cell is an erase state E or one of first to seventh program states P1 to P7.

Figure 4:
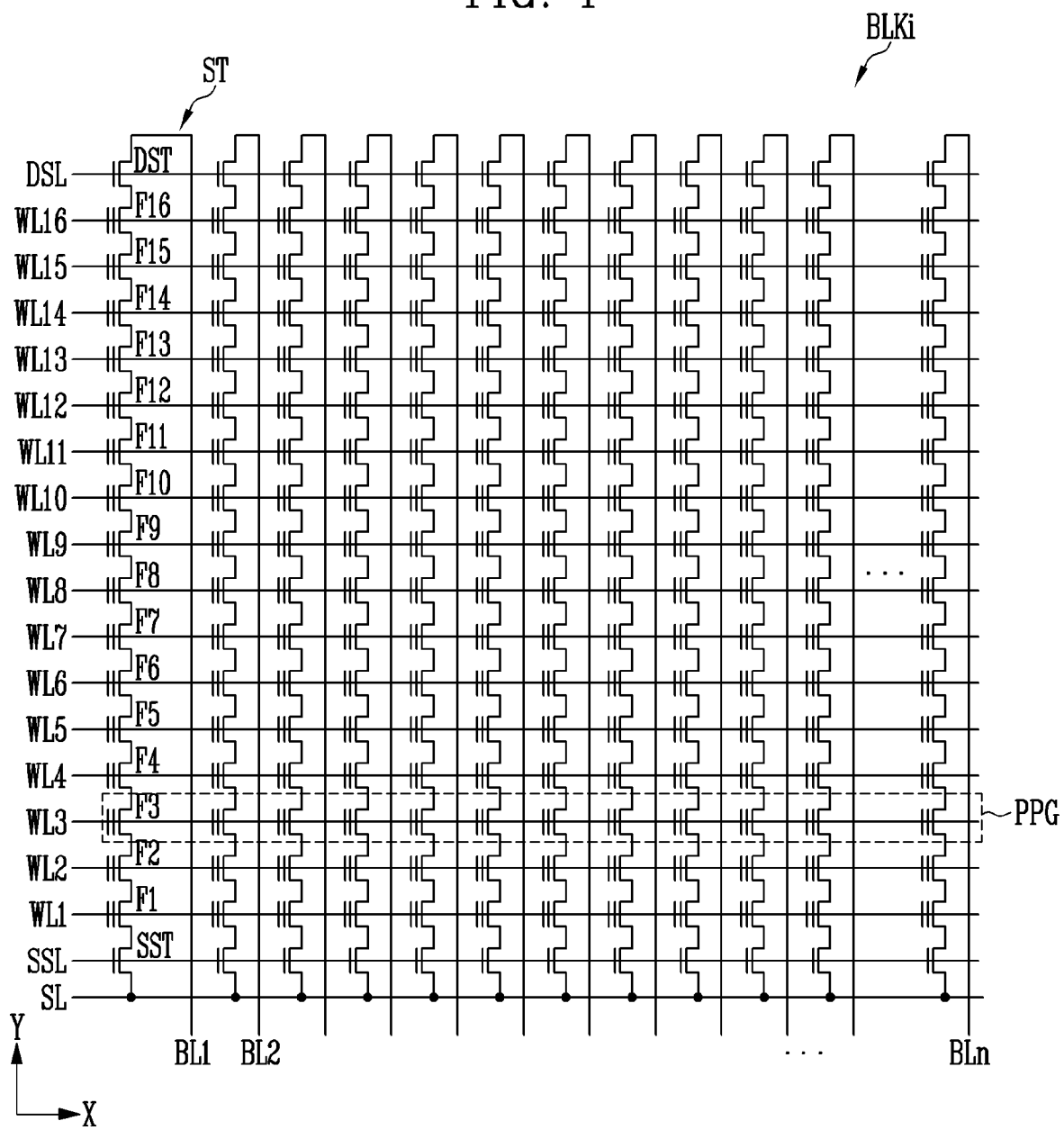
FIG. 4 is a diagram illustrating a memory block in accordance with an embodiment of the present disclosure.

FIG. 4 is a diagram illustrating a memory block BLKi in accordance with an embodiment of the present disclosure.

Referring to FIG. 4, in the memory block BLKi, a plurality of word lines arranged in parallel to each other may be connected between a first select line and a second select line. The first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be respectively connected to the strings ST, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells F1 to F16, and a drain select transistor DST, which are connected in series to each other between the source line SL and the first bit line BL1. At least one source select transistor SST and at least one drain select transistor DST may be included in one string ST, and a number of memory cells which is greater than that of the memory cells F1 to F16 shown in the drawing may be included in the one string ST.

A source of the source select transistor SST may be connected to the source line SL, and a drain of the drain select transistor DST may be connected to the first bit line BL1. The memory cells F1 to F16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells F1 to F16 may be connected to a plurality of word lines WL1 to WL16. A group of memory cells connected to the same word line among memory cells included in different strings ST may be referred to as a physical page PPG. Therefore, physical pages PPG corresponding to the number of the word lines WL1 to WL16 may be included in the memory block BLKi.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The SLC may store one-bit data. One physical page PG of the SLC may store one logical page (LPG) data. The one LPG data may include a number of data bits which correspond to that of cells included in the one physical page PG.

The MLC, the TLC, and the QLC may store two or more-bit data. One physical page PG may store two or more LPG data.

Figure 5:
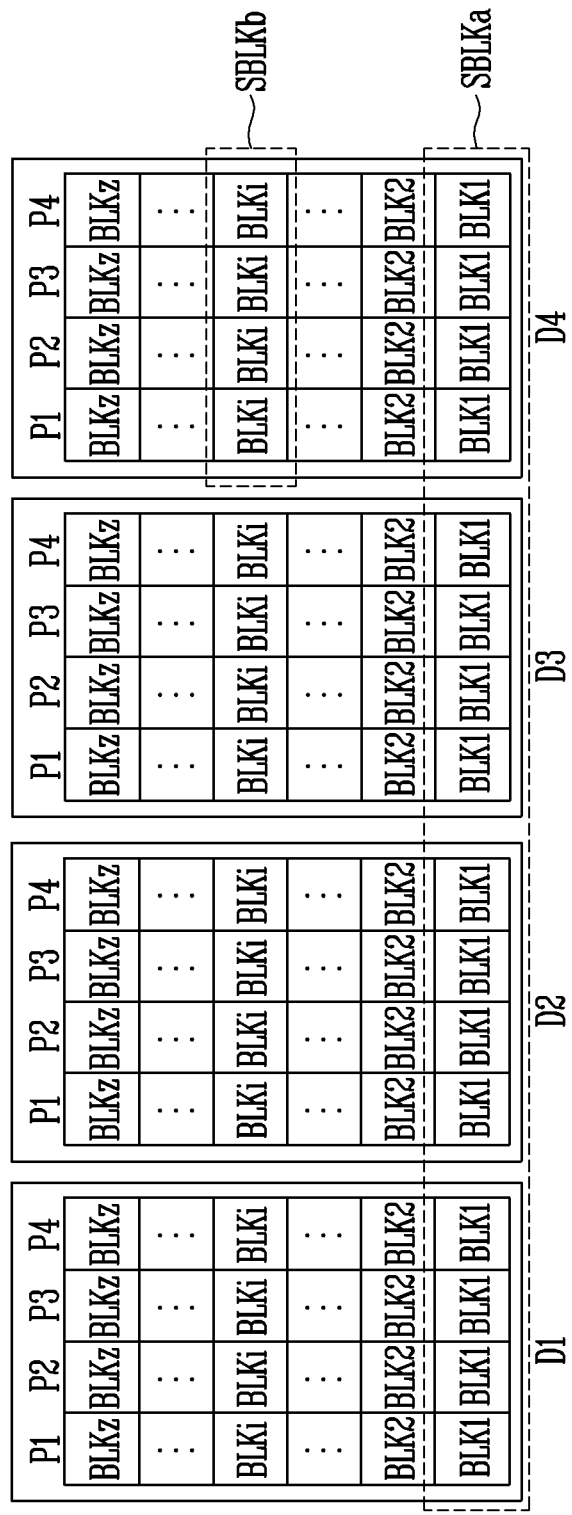
FIG. 5 is a diagram illustrating a super block in accordance with an embodiment of the present disclosure.

FIG. 5 is a diagram illustrating a super block in accordance with an embodiment of the present disclosure.

Referring to FIG. 5, the memory device 100 may include first to fourth dies D1 to D4, and each die may include a plurality of planes each including a plurality of memory blocks BLK1 to BLKz. Although a case where the memory device 100 includes four dies D1 to D4 and each die includes four planes P1 to P4 is illustrated in FIG. 5, this is merely an embodiment. It will be apparent that, in implementation, the memory device 100 may include a number of dies or planes which is greater than that shown in FIG. 5 or include a number of dies or planes which is less than that shown in FIG. 5.

A plurality of memory blocks may be grouped as a super block SBLK. The super block SBLK may be a set of memory blocks BLK on which a read operation, a write operation, or the like is performed simultaneously or at the same time zone. The super block SBLK may be a set of memory blocks BLK on which a read operation, a write operation, or the like is performed in association therewith or in relation thereto. Alternatively, the super block SBLK may be a set of memory blocks BLK, on which a read operation, a write operation, or the like is performed with respect to one command, or a set of memory blocks BLK, on which a read operation, a write operation, or the like is performed simultaneously or in associated therewith in the memory device 100. In addition, a group of memory blocks BLK distinguished from each other from the viewpoint of an operation among a plurality of memory blocks BLK may be referred to as a super block SBLK.

In an embodiment, sizes of superblocks SBLK may be different from each other. In addition, numbers of memory blocks BLK included in the respective super blocks SBLK may be different from each other. In addition, a plurality of memory blocks included in a super block SBLK may be all located in one die. Alternatively, two or more memory blocks BLK included in a super block SBLK may be located in two or more different dies.

For example, a super block SBLK may include super blocks SBLK having different sizes. Specifically, a first super block SBLKa may include memory blocks included in the first to fourth dies D1 to D4, and a second super block SBLKb may include memory blocks included in the fourth die D4. The first super block SBLKa and the second super block SBLKb may have different sizes, and numbers of memory blocks included in the respective first and second super blocks SBLKa and SBLKb may be different from each other.

In addition, each of a plurality of memory blocks included in a super block SBLK may include a plurality of pages PG. The plurality of pages PG may constitute a plurality of page rows according to a row order. One page row within the super block SBLK may be configured with several pages of the same row within the plurality of memory blocks of the super block SBLK.

Figure 6:
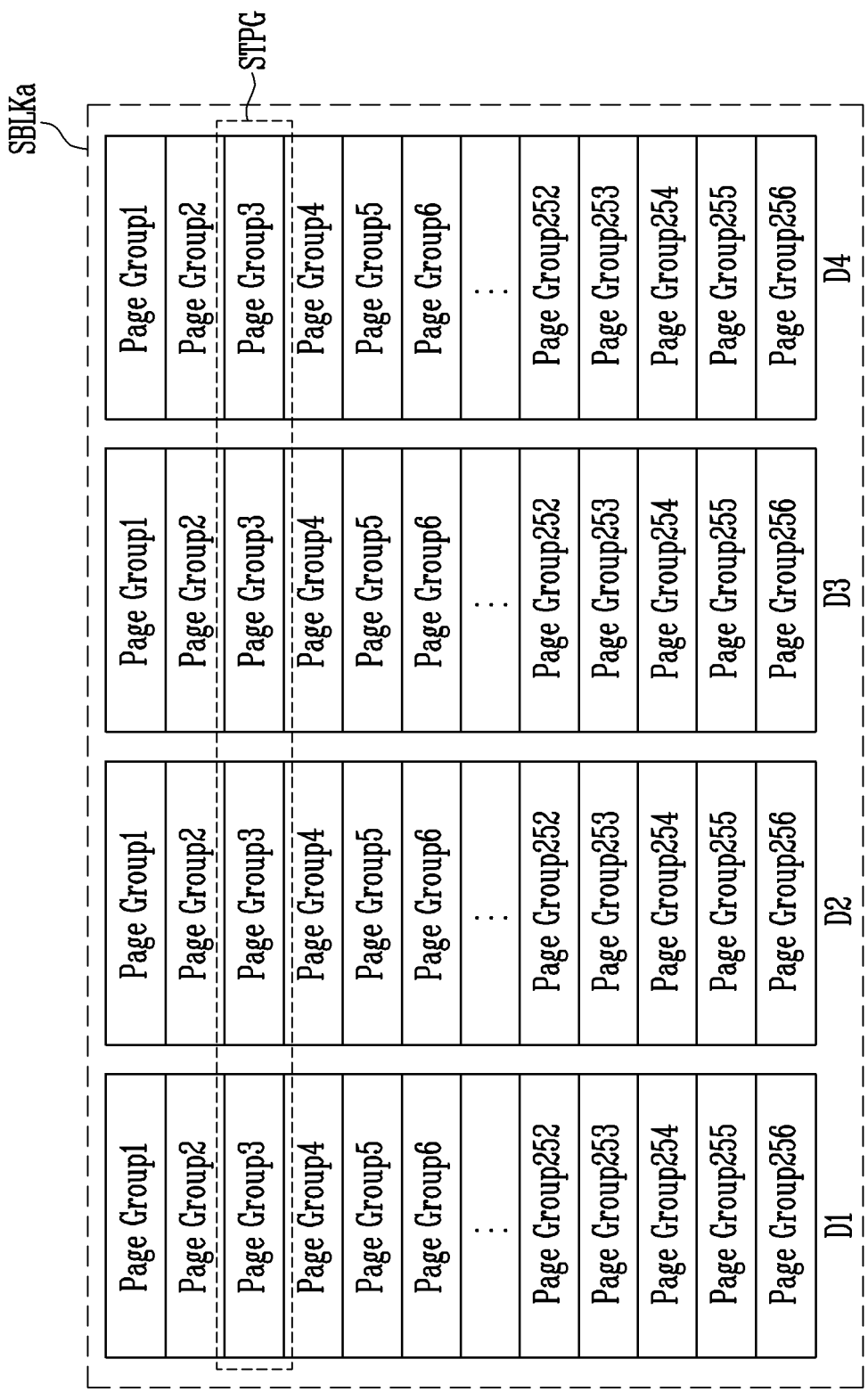
FIG. 6 is a diagram illustrating a stripe page in accordance with an embodiment of the present disclosure.

FIG. 6 is a diagram illustrating a stripe page in accordance with an embodiment of the present disclosure.

Referring to FIG. 6, the first super block SBLKa may include a plurality of page groups Page Group included in the first to fourth dies D1 to D4. The page group Page Group may be a group of pages having the same page row in one die. For example, a first page group may be a page group obtained by grouping pages having a first page row in one die. In addition, a plurality of page groups Page Group may constitute a stripe page STPG. That is, the stripe page STPG may include several page groups as sets of pages PG disposed in the same row order throughout a plurality of dies. For example, the stripe page STPG may include several page groups as sets of pages PG disposed in the same row order throughout the first to fourth dies D1 to D4. That is, in FIG. 6, the page group Page Group may be disposed according to a row order of a plurality of pages included in four planes P1 to P4 included in each of the first to fourth dies D1 to D4.

In addition, the number of page rows included in the stripe page STPG may be changed according to a storage method (e.g., SLC, MLC, TLC, or the like). In accordance with an embodiment, in the case of a Triple Level Cell (TLC), the stripe page STPG may include three page rows.

Figure 7:
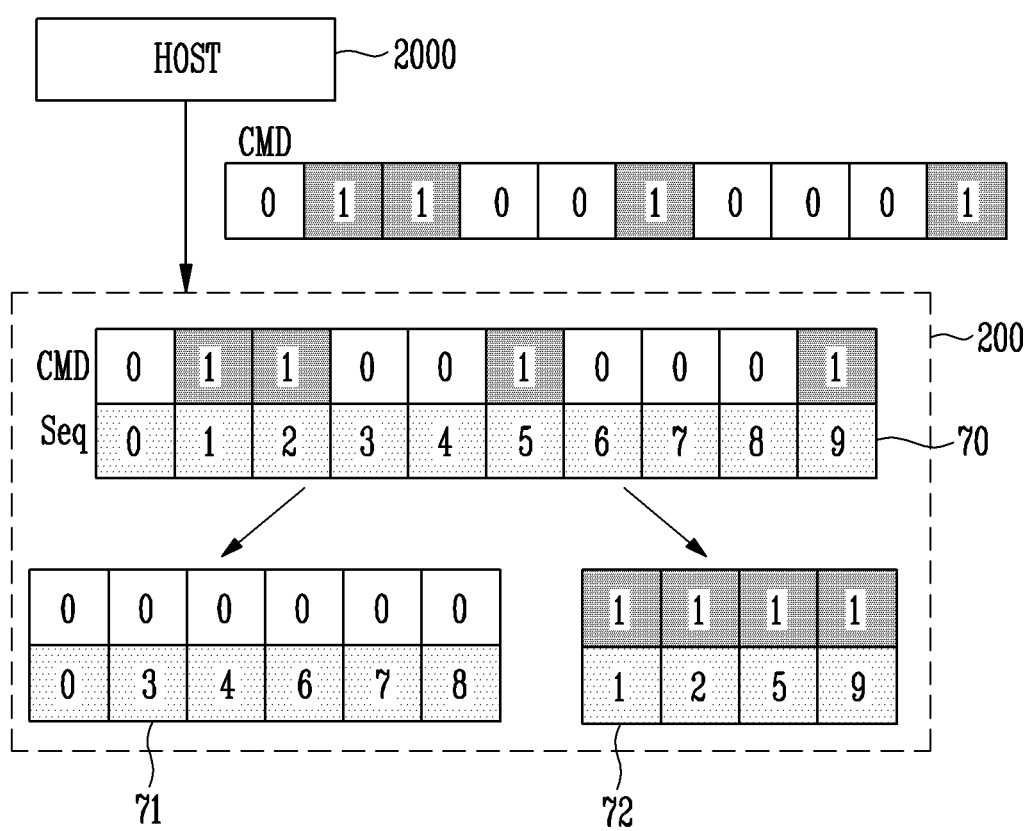
FIG. 7 is a diagram illustrating an operating method of a memory controller in accordance with an embodiment of the present disclosure.

FIG. 7 is a diagram illustrating an operating method of a memory controller 200 in accordance with an embodiment of the present disclosure.

Referring to FIG. 7, the memory controller 200 may sort a command received from the host 2000. Specifically, the memory controller 200 may sort a command received from the host 200 according to an attribute of the command, and control the buffer memory device 300 such that data corresponding to the command is stored in the buffer memory device 300. The attribute of the command may include a normal attribute corresponding to an attribute in which write data is normally stored, and a write boost attribute corresponding to an attribute in which write data is to be preferentially stored or to be stored at a high speed. Alternatively, the attribute of the command may mean a command input in another form according to a request of the host 2000. For example, the host 2000 may input a command obtained by changing the form of a command corresponding to the normal attribute, if necessary.

In an embodiment, the memory controller 200 may sort a command received from the host 2000 as '0' or '1' according to an attribute of the command. Also, the memory controller 200 may control the buffer memory device 300 such that write data 71 in which the attribute of the command corresponds to '0' is stored in a first buffer memory and write data 72 in which the attribute of the command corresponds to '1' is stored in a second buffer memory.

When a command is received from the host 2000, the memory controller 200 may give a sequence number 70 to the command according to a reception order of the command. The sequence number may represent an order of the command input to the memory controller 200 and may be used to distinguish old and new data from each other. In FIG. 7, sequence numbers corresponding to commands received from the host 2000 are given as numbers from '0' to '9.' A command having a sequence number '0' may be a command input earlier than that of a command having a sequence number '9.'

Figure 8:
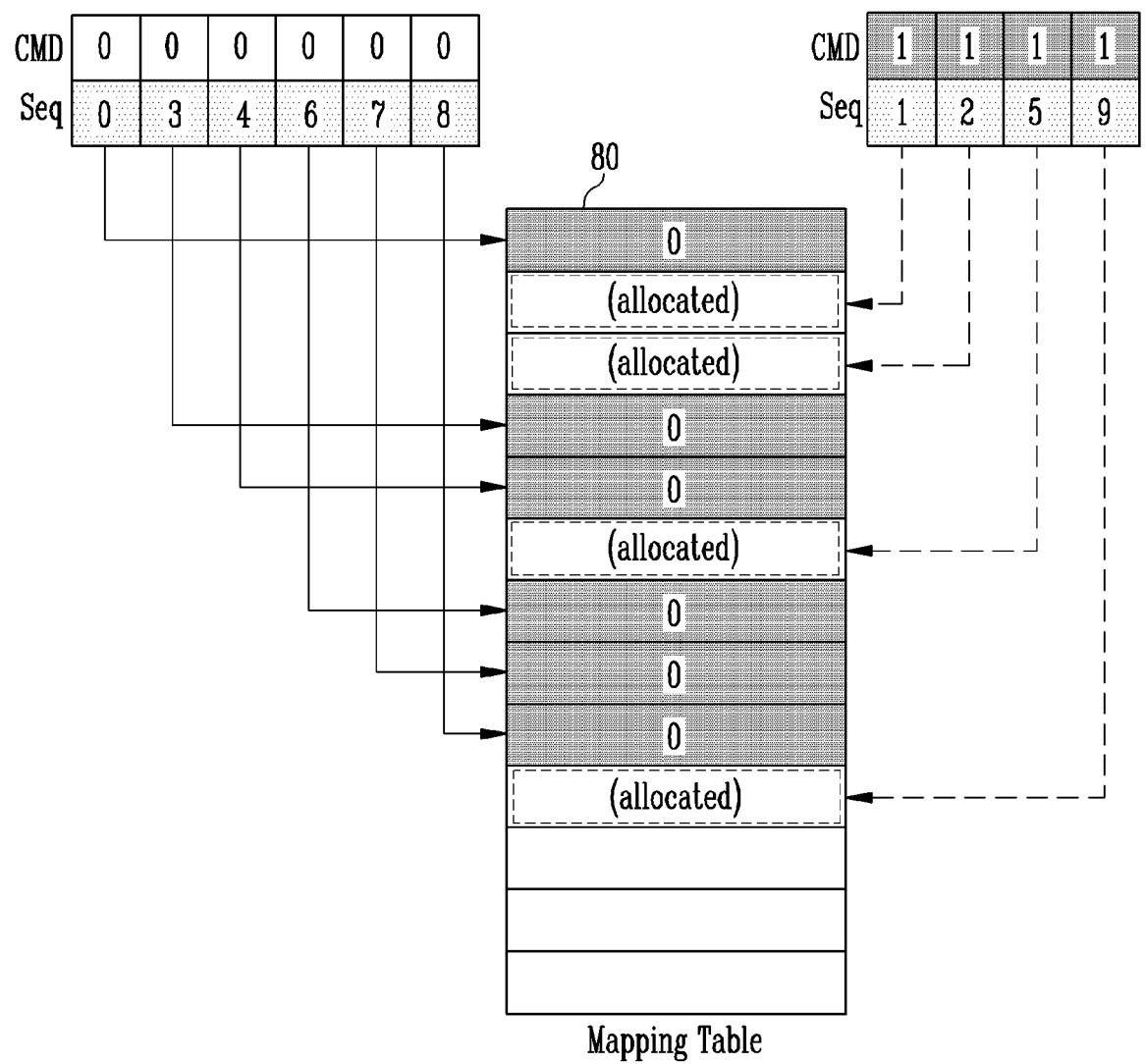
FIG. 8 is a diagram illustrating a method for updating a mapping table in accordance with an embodiment of the present disclosure.

FIG. 8 is a diagram illustrating a method for updating a mapping table in accordance with an embodiment of the present disclosure.

Referring to FIG. 8, a method in which the memory controller 200 updates a mapping table 80 is illustrated. The memory controller 200 may allocate a command to the mapping table 80 according to a reception order of the command from the host 2000. The memory controller 200 may allocate a command having a sequence number '0' to an upper end of the mapping table 80, and allocate a command having a sequence number '9' to a lower end of the mapping table 80.

When the memory controller 200 receives a command and a logical address corresponding to the command from the host 2000, the memory controller 200 may translate the received logical address into a physical address. Also, the memory controller 200 may update mapping information of the physical address and the logical address, which correspond to the command, in the mapping table 80. The mapping table 80 may be a Physical-to-Logical address (P2L) mapping table including information on a corresponding logical address according to an order of a physical address.

When write data stored in the buffer memory device 300 is flushed to the memory device 100, the memory controller 200 may update the mapping table 80 by using mapping information corresponding to the flushed write data. For example, when a first buffer memory which stores write data in which the attribute of a command corresponds to '0' is flushed, the memory controller 200 may update, in the mapping table 80, logical addresses corresponding to physical addresses of the commands of the sequence numbers '0,' '3,' '4,' '6,' '7,' and '8.' A second buffer memory which stores write data corresponding to the commands, having the attribute '1' may be in a state in which the second buffer memory is not flushed. That is, commands having the sequence numbers '1,' '2,' '5,' and '9' are merely allocated to the mapping table 80 and logical addresses, to which the commands having the sequence numbers '1,' '2,' '5,' and '9' correspond, may not be updated yet. In accordance with the embodiment of the present disclosure, when a plurality of buffer memories are included, old and new data can be effectively determined by using the mapping table.

Figure 9:
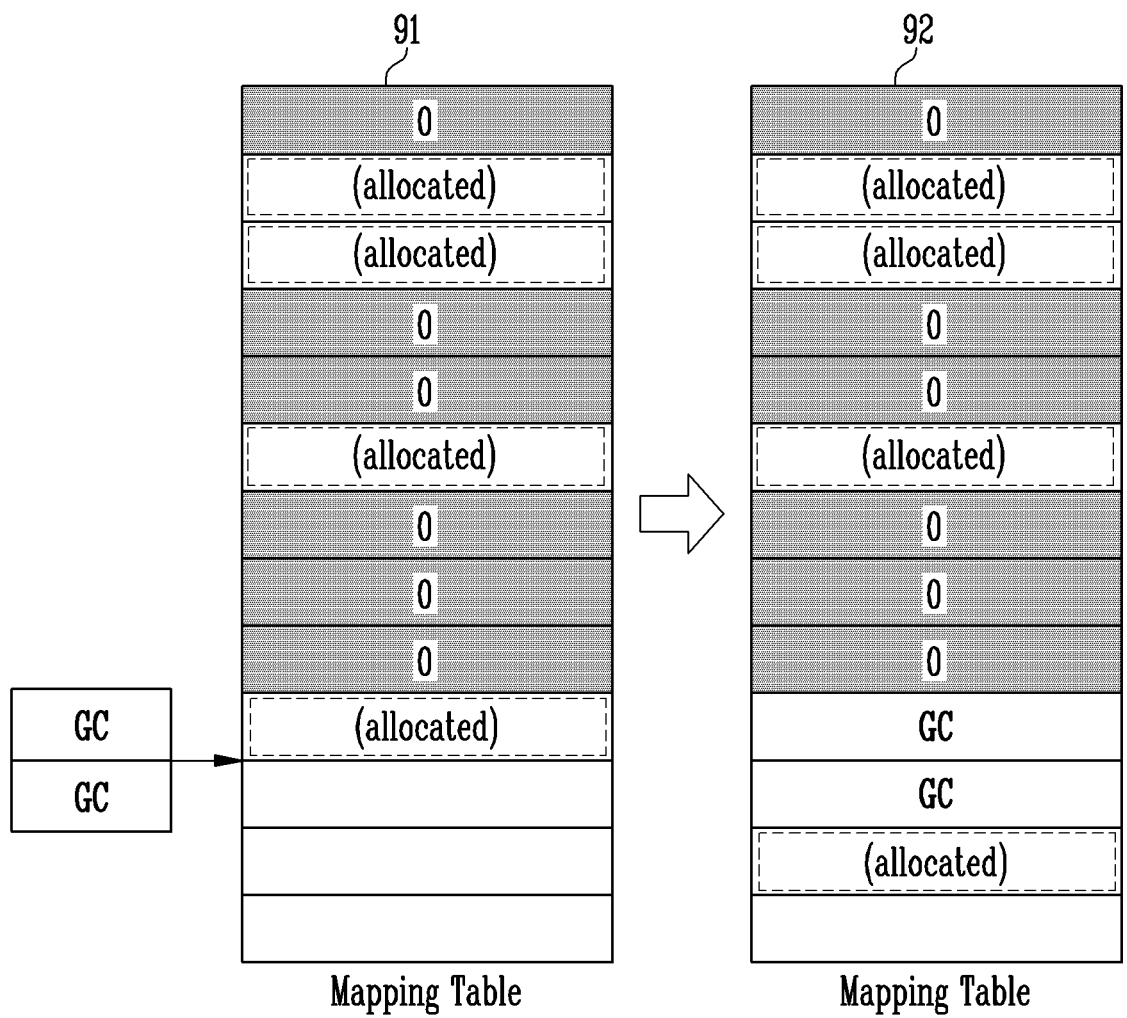
FIG. 9 is a diagram illustrating a method for inserting mapping information into the mapping table in accordance with an embodiment of the present disclosure.

FIG. 9 is a diagram illustrating a method for inserting mapping information into the mapping table in accordance with an embodiment of the present disclosure.

Referring to FIG. 9, a case where a garbage collection operation is performed in a state in which at least one buffer memory among a plurality of buffer memories is not flushed, is illustrated. As described in FIG. 8, the mapping table may be updated when any of the buffer memories is flushed. In another embodiment, the mapping table may be updated according to a predetermined period. In addition, a migration operation may be performed, in which data is moved within the memory device 100 in a state in which write data is temporarily stored in the buffer memory. For example, the migration operation may include a garbage collection operation and wear leveling operation. The memory controller 200 may control the memory device 100 to perform the migration operation regardless of a request from the host 200. The memory controller 200 may map a logical address corresponding to the migration operation to a physical address subsequent to that corresponding to the flushed write data. Specifically, 'allocated' in a first state 91 is a state in which a command is allocated to the mapping table and may be a state in which information on mapping information or information on a logical address is not updated. Also, the memory controller 200 may update the mapping table such that a logical address corresponding to the migration operation is stored next to a physical address corresponding to the most recently updated logical address. When an already-allocated command exists at a physical address corresponding to the migration operation, the memory controller 200 may reallocate the already-allocated command to a physical address subsequent to the physical address corresponding to the migration operation.

Figure 10:
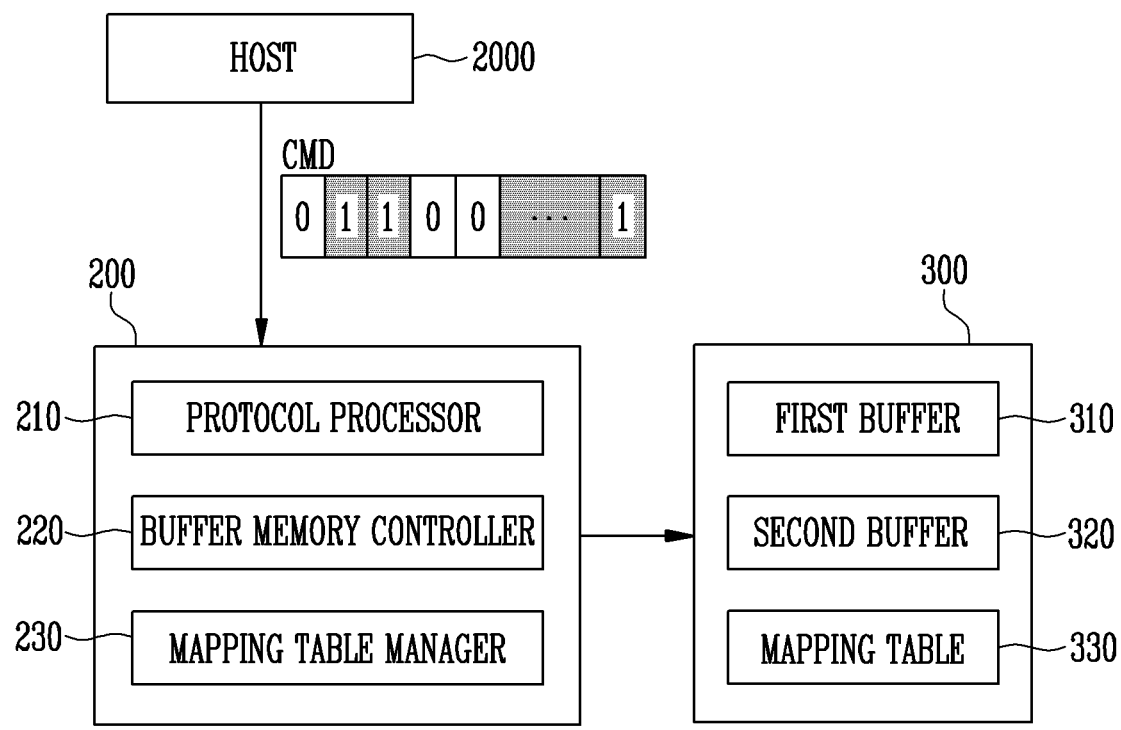
FIG. 10 is a diagram illustrating a memory controller and a buffer memory device in accordance with an embodiment of the present disclosure.

FIG. 10 is a diagram illustrating a memory controller and a buffer memory device in accordance with an embodiment of the present disclosure.

Referring to FIG. 10, a memory controller 200 including a protocol processor 210, a buffer memory controller 220, and a mapping table manager 230, and a buffer memory device 300 including a first buffer 310, a second buffer 320, and a mapping table 330 are illustrated.

When the protocol processor 210 receives a command from the host 2000, the protocol processor 210 may give a sequence number to the command according to a reception order of the command and sort the command into a command corresponding to one of the first buffer 310 and the second buffer 320 according to an attribute of the command. The attribute of the command may include a normal attribute corresponding to an attribute in which write data is normally stored, and a write boost attribute corresponding to an attribute in which write data is to be preferentially stored or to be stored at a high speed. Alternatively, the attribute of the command may mean a command input in another form according to a request of the host 2000. For example, the host 2000 may input a command obtained by changing the form of a command corresponding to the normal attribute, if necessary.

The buffer memory controller 220 may control the buffer memory device 300 to flush write data stored in the buffer memory device 300 to the memory device 100. Specifically, when any of the first buffer 310 and the second buffer 320 is fully filled, the buffer memory controller 220 may control the buffer memory device 300 to flush, to the memory device 100, write data temporarily stored in the fully filled buffer. Also, when logical addresses are mapped to all physical addresses included in a mapping table, the buffer memory controller 220 may control the buffer memory device 300 to flush all write data stored in the buffer memory device 300 to the memory device 100. When the logical addresses are mapped to all the physical addresses may mean that any physical address to be allocated no longer exists in the mapping table 330 loaded to the buffer memory device 300.

In an embodiment, when a command corresponding to write data having a size greater than a remaining capacity of the buffer memory device 300 is input from the host 2000, the buffer memory controller 220 may control the buffer memory device 300 to flush all write data stored in the buffer memory device 300 to the memory device 100.

The mapping table manager 230 may control the buffer memory device 300 to read a mapping table for at least one open block among a plurality of memory blocks. Specifically, the mapping table manager 230 may control the buffer memory device 300 to read or load, from the memory device 100, a mapping table for an open block in which data is not fully stored among a plurality of memory blocks included in the memory device 100. The mapping table manager 230 may control the buffer memory device 300 to update the mapping table, based on mapping information including a logical address corresponding to a physical address.

Also, when a migration operation of moving data stored in a first block to a second block is performed, the mapping table manager 230 may map a logical address corresponding to the migration operation to a physical address subsequent to that corresponding to the flushed write data.

Also, when an already-allocated command exists at the subsequent physical address, the mapping table manager 230 may reallocate the already-allocated command to a physical address subsequent to the subsequent physical address.

In addition, the mapping table 330 may include a flag representing that a command is allocated to a physical address. When at least one command is allocated in the mapping table 330, the mapping table manager 230 may control the buffer memory device 300 to set a flag corresponding to the allocated at least one command.

In an embodiment, the mapping table manager 230 may control the buffer memory 300 and the memory device 100 to update the mapping table, whenever any of the buffer memories is flushed. In another embodiment, the mapping table manager 230 may control the buffer memory 300 and the memory device 100 to update the mapping table according to a predetermined period.

Figure 11:
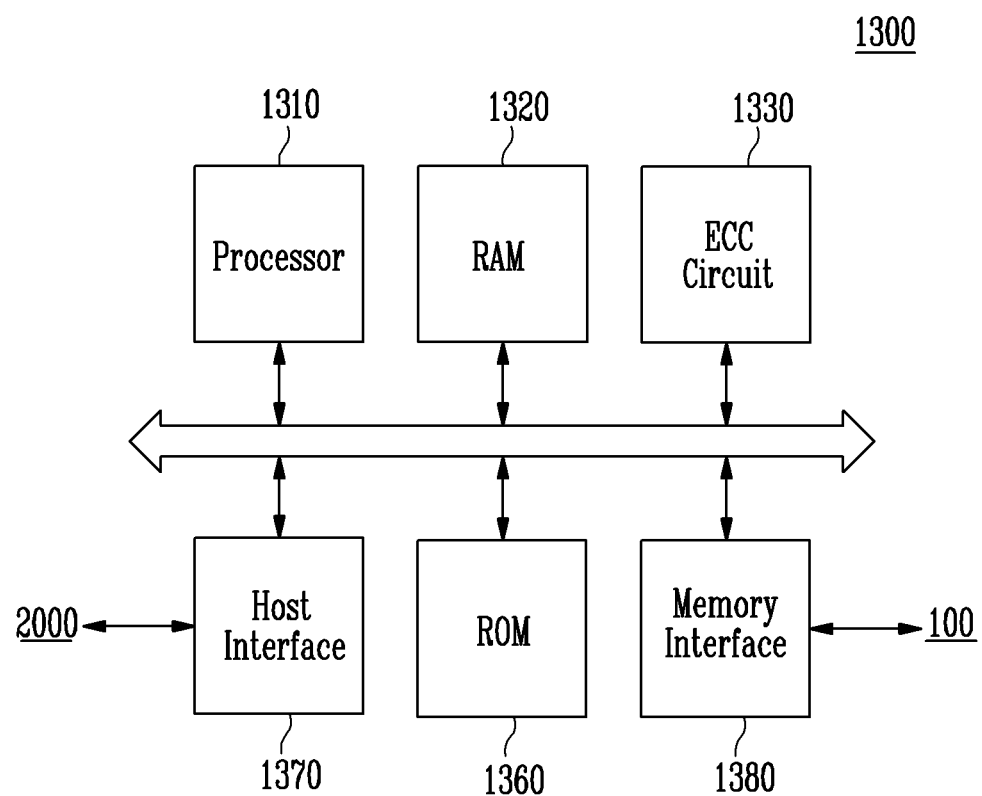
FIG. 11 is a diagram illustrating a memory controller in accordance with another embodiment of the present disclosure.

FIG. 11 is a diagram illustrating a memory controller 1300 in accordance with another embodiment of the present disclosure.

Referring to FIG. 11, the memory controller 1300 may include a processor 1310, a RAM 1320, an ECC circuit 1330, a ROM 1360, a host interface 1370, and a memory interface 1380. The memory controller 1300 shown in FIG. 11 may be an embodiment of the memory controller 200 shown in FIG. 1.

The processor 1310 may communicate with the host 2000 by using the host interface 1370, and perform a logical operation to control an operation of the memory controller 1300. For example, the processor 1310 may load a program command, a data file, a data structure, etc., based on a request received from the host 2000 or an external device, and perform various operations or generate a command and an address. For example, the processor 1310 may generate various commands necessary for a program operation, a read operation, an erase operation, a suspend operation, and a parameter setting operation.

The processor 1310 may perform a function of a Flash Translation Layer (FTL). The processor 250 may translate a Logical Block Address (LBA) provided by the host 2000 into a Physical Block Address (PBA) through the FTL. The FTL may receive an LBA input by using a mapping table, to translate the LBA into a PBA. Several address mapping methods of the FTL exist according to mapping units. A representative address mapping method includes a page mapping method, a block mapping method, and a hybrid mapping method.

The processor 1310 may generate a command without any request from the host 2000. For example, the processor 1310 may generate a command for background operations such as operations for wear leveling of the memory device 100 and operations for garbage collection of the memory device 100.

The RAM 1320 may be used as a buffer memory, a working memory, or a cache memory of the processor 1310. The RAM 1320 may store codes and commands, which the processor 1310 executes. The RAM 1320 may store data processed by the processor 1310. Also, the RAM 1320 may be implemented by including a Static RAM (SRAM) or a Dynamic RAM (DRAM).

The ECC circuit 1330 may detect an error in a program operation or a read operation, and correct the detected error. Specifically, the ECC circuit 1330 may perform an error correction operation according to an Error Correction Code (ECC). The ECC circuit 1330 may perform ECC encoding, based on data to be written to the memory device 100. The data on which the ECC encoding is performed may be transferred to the memory device 100 through the memory interface 1380. The ECC circuit 1330 may perform ECC decoding on data received from the memory device 100 through the memory interface 1380.

The ROM 1360 may be used as a storage unit for storing various information necessary for an operation of the memory controller 1300. Specifically, the ROM 1360 may include a map table, and physical-to-logical address information and logical-to-physical address information may be stored in the map table. Also, the ROM 1360 may be controlled by the processor 1310.

The host interface 1370 may include a protocol for exchanging data between the host 2000 and the memory controller 1300. Specifically, the host interface 1370 may communicate with the host 2000 through at least one of various communication standards or interfaces such as a Universal Serial Bus (USB) protocol, a Multi-Media Card (MMC) protocol, a Peripheral Component Interconnection (PCI) protocol, a PCI-Express (PCI-e or PCIe) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a private protocol.

The memory interface 1380 may communicate with the memory device 100 by using a communication protocol under the control of the processor 1310. Specifically, the memory interface 1380 may communicate a command, an address, and data with the memory device 100 through a channel. For example, the memory interface 1380 may include a NAND interface.

Figure 12:
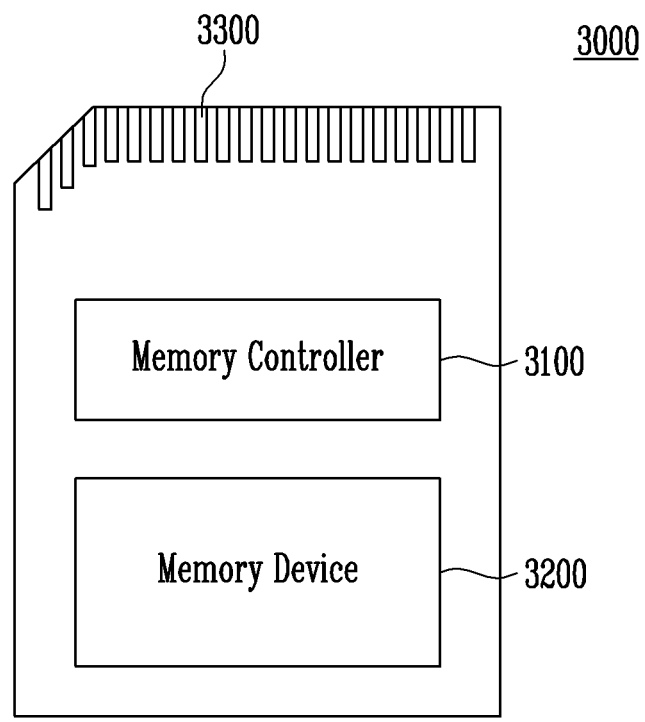
FIG. 12 is a diagram illustrating a memory card system in accordance with an embodiment of the present disclosure.

FIG. 12 is a diagram illustrating a memory card system 3000 in accordance with an embodiment of the present disclosure.

Referring to FIG. 12, the memory card system 3000 includes a memory controller 3100, a memory device 3200, and a connector 3300.

The memory controller 3100 may be connected to the memory device 3200. The memory controller 3100 may access the memory device 3200. For example, the memory controller 3100 may control read, write, erase, and background operations on the memory device 3200. The memory controller 3100 may provide an interface between the memory device 3200 and a host. Also, the memory controller 3100 may drive firmware for controlling the memory device 3200.

For example, the memory controller 3100 may include components such as a Random Access Memory (RAM), a processing unit, a host interface, a memory interface, and the error corrector 233.

The memory controller 3100 may communicate with an external device through the connector 3300. The memory controller 3100 may communicate with the external device (e.g., the host) according to a specific communication protocol. The memory controller 3100 may communicate with the external device through at least one of various communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

The memory device 3200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Transfer Torque magnetic RAM (STT-MRAM).

The memory controller 3100 and the memory device 3200 may be integrated into a single semiconductor device, to constitute a memory card. For example, the memory controller 3100 and the memory device 3200 may constitute a memory card such as a PC card (Personal Computer Memory Card International Association (PCMCIA)), a Compact Flash (CF) card, a Smart Media Card (e.g., SM and SMC), a memory stick, a Multi-Media Card (e.g., MMC, RS-MMC, MMCmicro and eMMC), a secure digital (SD) card (e.g., SD, miniSD, microSD and SDHC), and a Universal Flash Storage (UFS).

Figure 13:
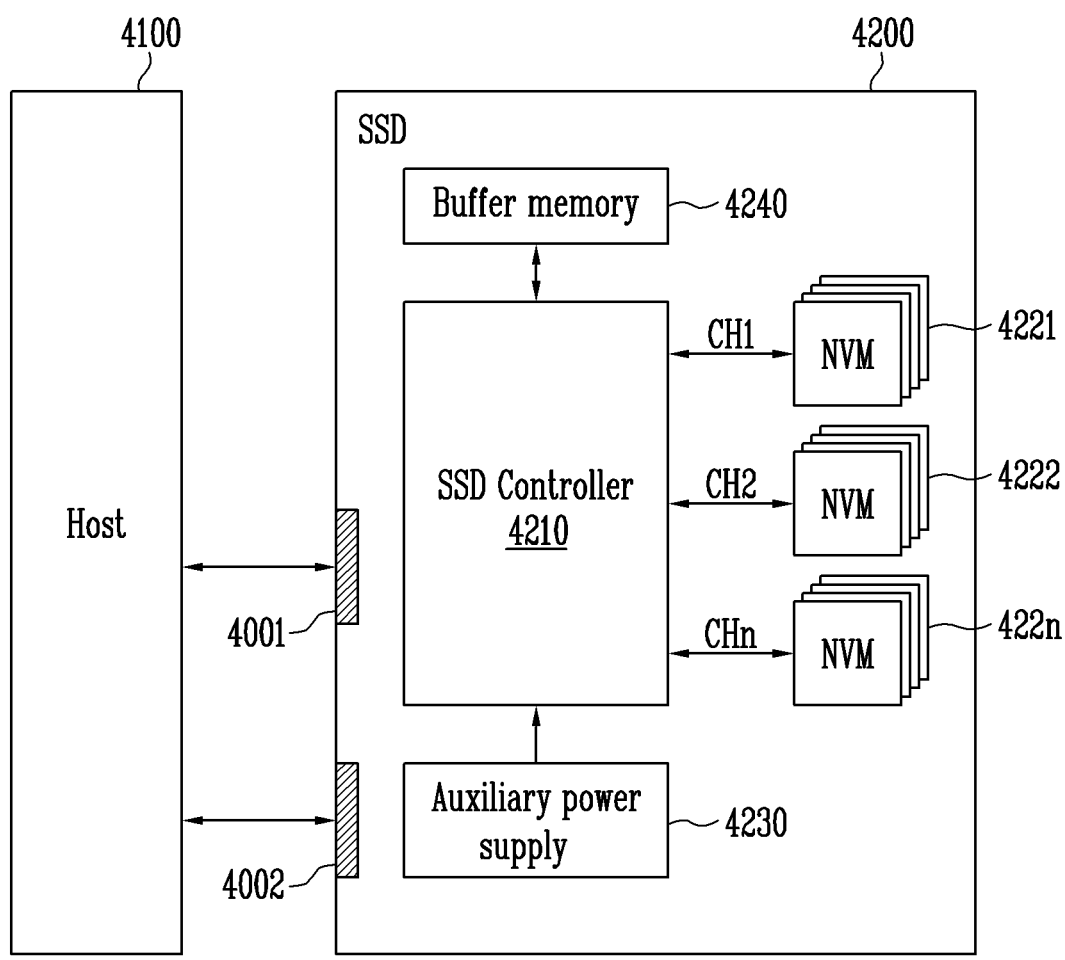
FIG. 13 is a diagram illustrating a Solid State Drive (SSD) in accordance with an embodiment of the present disclosure.

FIG. 13 is a diagram illustrating a Solid State Drive (SSD) 4000 in accordance with an embodiment of the present disclosure.

Referring to FIG. 13, the SSD system 4000 includes a host 4100 and an SSD 4200. The SSD 4200 exchanges a signal SIG with the host 4100 through a signal connector 4001, and receives power PWR through a power connector 4002. The SSD 4200 includes an SSD controller 4210, a plurality of flash memories 4221 to 422n, an auxiliary power supply 4230, and a buffer memory 4240.

In an embodiment, the SSD controller 4210 may serve as the memory controller 200 described with reference to FIG. 1. The SSD controller 4210 may control the plurality of flash memories 4221 to 422n in response to a signal SIG received from the host 4100. The signal SIG may be a signal based on an interface between the host 4100 and the SSD 4200. For example, the signal SIG may be a signal defined by at least one of communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a Wi-Fi, a Bluetooth, and an NVMe.

The auxiliary power supply 4230 may be connected to the host 4100 through the power connector 4002. The auxiliary power supply 4230 may receive power PWR input from the host 4100 and charge the power PWR. When the supply of power from the host 4100 is not smooth, the auxiliary power supply 4230 may provide power to the SSD 4200. The auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as a buffer memory of the SSD 4200. For example, the buffer memory 4240 may temporarily store data received from the host 4100 or data received from the plurality of flash memories 4221 to 422n, or temporarily store meta data (e.g., a mapping table) of the flash memories 4221 to 422n. The buffer memory 4240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 14:
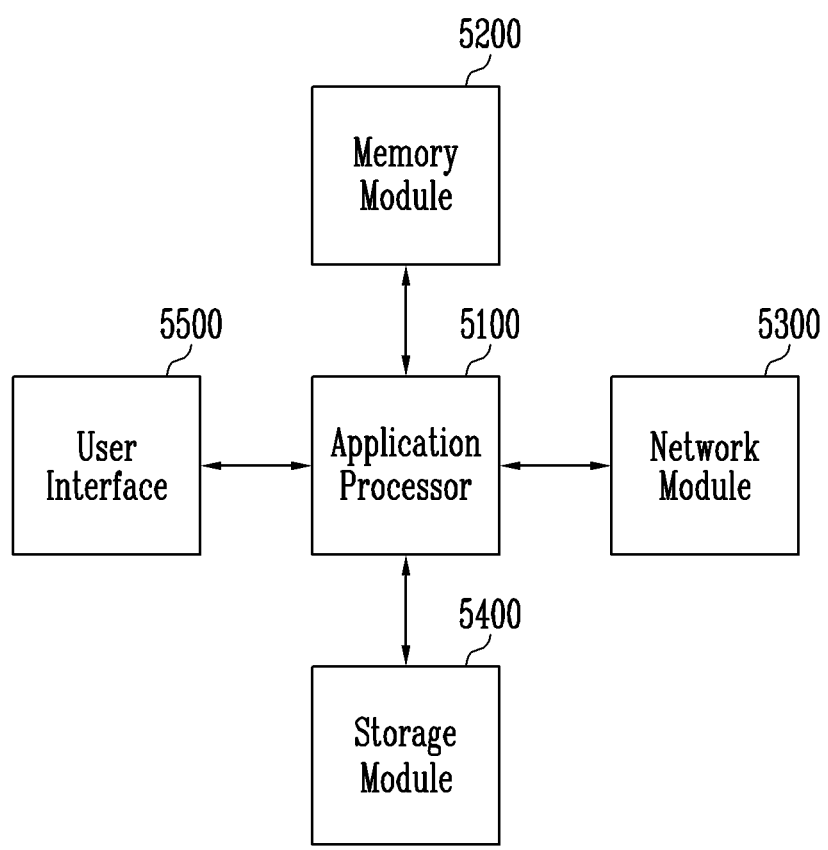
FIG. 14 is a diagram illustrating a user system in accordance with an embodiment of the present disclosure.

FIG. 14 is a diagram illustrating a user system 5000 in accordance with an embodiment of the present disclosure.

Referring to FIG. 14, the user system 5000 includes an application processor 5100, a memory module 5200, a network module 5300, a storage module 5400, and a user interface 5500.

The application processor 5100 may drive components included in the user system 5000, an operating system (OS), a user program, or the like. The application processor 5100 may include controllers for controlling components included in the user system 5000, interfaces, a graphic engine, and the like. The application processor 5100 may be provided as a System-on-Chip (SoC).

The memory module 5200 may operate as a main memory, working memory, buffer memory or cache memory of the user system 5000. The memory module 5200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. The application processor 5100 and the memory module 5200 may be provided as one semiconductor package by being packaged based on a Package on Package (PoP).

The network module 5300 may communicate with external devices. The network module 5300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), WiMAX, WLAN, UWB, Bluetooth, and Wi-Fi. The network module 5300 may be included in the application processor 5100.

The storage module 5400 may store data. For example, the storage module 5400 may store data received from the application processor 5100. Alternatively, the storage module 5400 may transmit data stored therein to the application processor 5100. The storage module 5400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. The storage module 5400 may be provided as a removable drive such as a memory card of the user system 5000 or an external drive.

The storage module 5400 may include a plurality of nonvolatile memory devices, and the plurality of nonvolatile memory devices may operate identically to the memory device 100 described with reference to FIGS. 1 to 4. The storage module 4400 may operate identically to the storage device 1000 described with reference to FIG. 1.

The user interface 5500 may include interfaces for inputting data or commands to the application processor 5100 or outputting data to an external device. The user interface 5500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there can be provided a storage device for sorting data having different attributes in a plurality of buffer memories and effectively managing a P2L table.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Various embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims.

What is claimed is:

1. A storage device comprising:
a memory device including a plurality of memory blocks;
a buffer memory device including a first buffer and a second buffer; and
a memory controller configured to control the memory device and the buffer memory device to perform a write operation of storing a-write data in the memory device,
wherein the memory controller is further configured to:
allocate a sequence number to a command, when the memory controller receives the command from a host, according to a reception order of the command;
store the write data, corresponding to the command, to one of the first buffer and the second buffer according to an attribute of the command;
map, when the write data is flushed to the memory device, a logical address, corresponding to the command, to a physical address, wherein the physical address is allocated prior to mapping the logical address to the physical address;
map, when a migration operation of moving data stored in a first block to a second block is performed, a logical address corresponding to the migration operation to a physical address subsequent to the flushed write data; and
reallocate, when an already-allocated command exists at the subsequent physical address, the already-allocated command to a physical address subsequent to the subsequent physical address.

2. The storage device of claim 1, wherein the memory controller is further configured to:
read a mapping table which includes mapping information of a physical address and a logical address for at least one open block among the plurality of memory blocks from the memory device;
store the mapping table to the buffer memory device; and
update the mapping table.

3. The storage device of claim 1, wherein the memory controller is further configured to control, when one of the first buffer and the second buffer is fully filled, the buffer memory device to flush, to the memory device, write data temporarily stored in the fully filled buffer.

4. The storage device of claim 3, wherein the memory controller is further configured to control, when logical addresses are mapped to all physical addresses included in a mapping table which includes mapping information of the physical addresses and the logical addresses, the buffer memory device to flush all write data stored in the buffer memory device to the memory device.

5. The storage device of claim 3, wherein the memory controller is further configured to control, when a command, corresponding to write data having a size greater than a remaining capacity of the buffer memory device, is input from the host, the buffer memory device to flush all write data stored in the buffer memory device to the memory device.

6. A storage device comprising:
a buffer memory device including a mapping table including mapping information of a physical address and a logical address of a memory device; and
a memory controller configured to:
allocate a sequence number to a command, when the memory controller receives the command from a host, according to a reception order of the command;
store a-write data, corresponding to the command, to one of a first buffer and a second buffer, which are included in the buffer memory device, according to an attribute of the command;
map, when the write data is flushed to the memory device, a logical address, corresponding to the command, to a physical address, wherein the physical address is allocated prior to mapping the logical address to the physical address;
map, when a migration operation of moving data stored in a first block to a second block is performed, a logical address corresponding to the migration operation to a physical address subsequent to the flushed write data; and
reallocate, when an already-allocated command exists at the subsequent physical address, the already-allocated command to a physical address subsequent to the subsequent physical address.

7. The storage device of claim 6, wherein the memory controller is further configured to:
read, from the memory device, a mapping table which includes mapping information of a physical address and a logical address for at least one open block among a plurality of memory blocks included in the memory device;
store the mapping table to the buffer memory device; and
update the mapping table.

8. The storage device of claim 6, wherein the memory controller is further configured to control, when one of the first buffer and the second buffer is fully filled, the buffer memory device to flush, to the memory device, write data temporarily stored in the fully filled buffer.

9. The storage device of claim 8, wherein the memory controller is further configured to control, when a command, corresponding to write data having a size greater than a remaining capacity of the buffer memory device, is input from the host, the buffer memory device to flush all write data stored in the buffer memory device to the memory device.

\* \* \* \* \*